US 6,636,787 B2

(12) United States Patent
Yamaguchi et al.

(10) Patent No.: US 6,636,787 B2
(45) Date of Patent: Oct. 21, 2003

(54) APPARATUS, METHOD, AND PROGRAM FOR DRIVINGLY CONTROLLING HYBRID VEHICLES

(75) Inventors: Kozo Yamaguchi, Anjo (JP); Akira Suzuki, Anjo (JP); Toshihiro Shiimado, Anjo (JP); Hiroyuki Kojima, Anjo (JP); Takehiko Suzuki, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 10/101,366

(22) Filed: Mar. 20, 2002

(65) Prior Publication Data

US 2002/0143441 A1 Oct. 3, 2002

(30) Foreign Application Priority Data

Mar. 30, 2001 (JP) ......................................... 2001-101956

(51) Int. Cl.$^7$ ............................................... B60K 6/04
(52) U.S. Cl. ........................... 701/22; 701/23; 701/25; 180/65.2
(58) Field of Search .............................. 701/22, 23, 25, 701/200, 213, 207; 477/20, 16, 3; 180/65.2, 165, 65.4

(56) References Cited

U.S. PATENT DOCUMENTS

| 5,720,690 A | | 2/1998 | Hara et al. ..................... 477/20 |
| 5,915,801 A | * | 6/1999 | Taga et al. .................. 303/152 |
| 6,314,347 B1 | * | 11/2001 | Kuroda et al. ................. 701/22 |

* cited by examiner

*Primary Examiner*—Marthe Y. Marc-Coleman
(74) *Attorney, Agent, or Firm*—Oliff & Berridge, PLLC (57) ABSTRACT

A hybrid vehicle drive controller, to improve driving comfort during running control, that detects the position of the vehicle and road-condition information, calculates a required deceleration, an optimal speed-change stage, and an adjustable torque. The invention includes, transmission to change the vehicle's speed on the basis of the vehicle position, road-condition information and optimal speed-change stage, and a torque control processor for driving a drive motor that generates the adjustable torque. A regenerative torque is calculated and generated on the basis of the required deceleration and the deceleration corresponding to the optimal speed-change stage.

10 Claims, 8 Drawing Sheets

|     | C-1 | C-2 | C-3 | B-1 | B-2 | B-3 | B-4 | B-5 | F-1 | F-2 |
|-----|-----|-----|-----|-----|-----|-----|-----|-----|-----|-----|
| N   |     |     |     |     |     |     |     | ○   |     |     |
| 1st | ○   |     |     |     |     | △   |     | ○   |     | ○   |
| 2nd | ○   |     |     | △   | ○   |     |     | ○   | ○   |     |
| 3rd | ○   |     |     | △   | ○   |     | ○   |     | ○   |     |
| 4th | ○   |     | ○   | △   | ○   |     |     |     | ○   |     |
| 5th | ○   | ○   | ○   |     | ○   |     |     |     |     |     |
| REV |     | ○   |     |     |     | ○   |     | ○   |     |     |

○ ENGAGEMENT, LOCK     △ DURING ENGINE BRAKING

APPARATUS, METHOD, AND PROGRAM FOR DRIVINGLY CONTROLLING HYBRID VEHICLES

INCORPORATION BY REFERENCE

The disclosure of Japanese Patent Application No. 2001-101956 filed on Mar. 30, 2001 including the specification, drawings and abstract is incorporated herein by reference in its entirety.

BACKGROUND OF THE INVENTION

1. Field of Invention

The present invention relates to an apparatus, a method, and a program for drivingly controlling hybrid vehicles.

2. Description of Related Art

A conventional navigation system is designed to detect a current position of a vehicle, by means of a current position detection means, detect an azimuth of a driver's vehicle, by means of an azimuth detection means, and display the detected current position, the detected azimuth of the driver's vehicle, and a map of the surrounding area on a map screen set on a display. In the case where the navigation system is employed as a route search system, if an operator such as a driver inputs a destination, the navigation system searches for a route from a current position to the destination and displays the current position, an azimuth of a driver's vehicle, a map of the surrounding area, and a found route (hereinafter referred to as "the found route") on the map screen. Accordingly, the driver can drive the vehicle while following the found route.

There has also been provided a vehicle control apparatus that is designed to transmit information regarding navigation from a navigation system to an automatic-transmission control unit and perform running control such as corner control on the basis of the information regarding navigation. When the vehicle is about to negotiate a corner, the vehicle control apparatus operates such that the navigation system sets recommended speed-change stages on the basis of road conditions and that the automatic-transmission control unit selects a certain one of the recommended speed-change stages. As a result, the vehicle can negotiate the corner with the selected speed-change stage.

In the aforementioned vehicle control apparatus according to the related art, however, while information regarding navigation is generated for each of different road conditions, two or three speed-change stages are set. Therefore, the vehicle cannot always negotiate a corner while being decelerated at a suitable deceleration. As a result, driving comfort deteriorates during corner control.

SUMMARY OF THE INVENTION

The present invention has been made to provide a solution to the aforementioned problem of the vehicle control apparatus according to the related art. It is an objective of the present invention to provide an apparatus, a method, and a program for drivingly controlling hybrid vehicles with improved driving comfort during running control.

DETAILED DESCRIPTION OF PREFERRED EMBODIMENTS

An embodiment of the present invention will be described hereinafter in detail with reference to the drawings.

Figure 1:
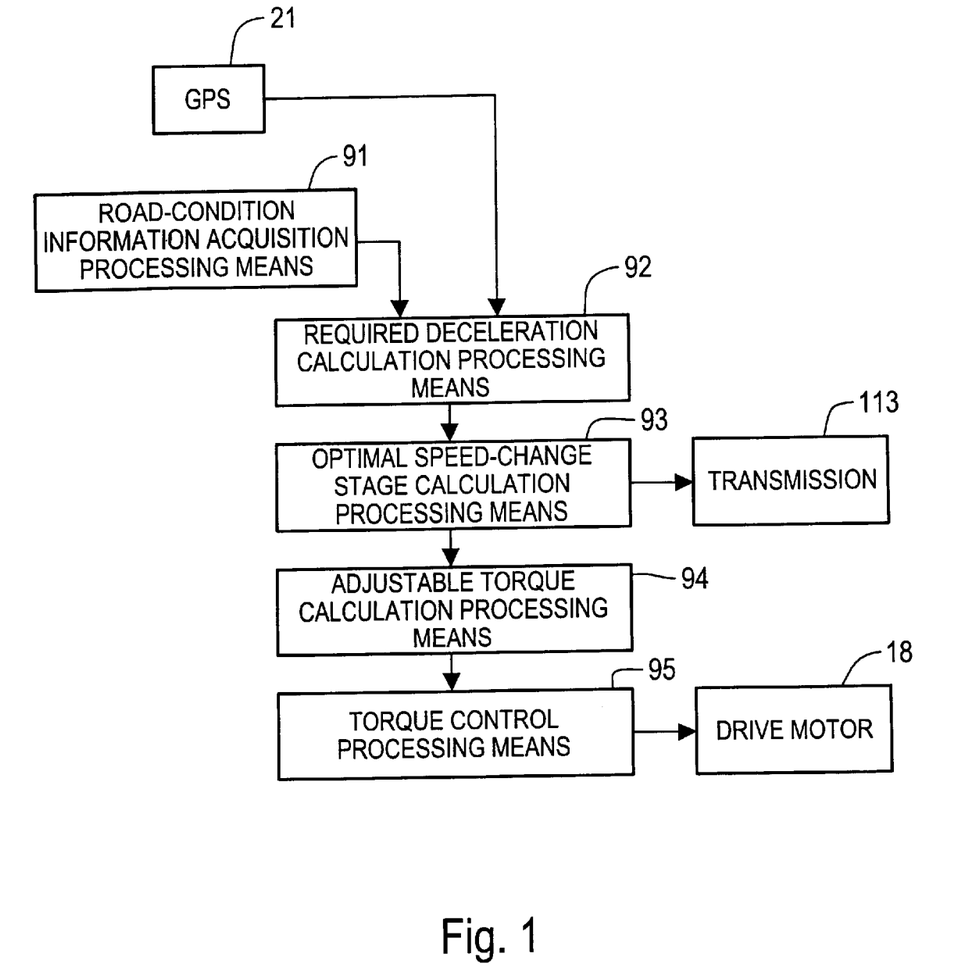
FIG. 1 is a functional block diagram of an apparatus for drivingly controlling hybrid vehicles according to an embodiment of the present invention.

FIG. 1 is a functional block diagram of an apparatus for drivingly controlling hybrid vehicles according to the embodiment of the present invention.

FIG. 1 shows a drive motor 18, a Global Positioning System (GPS) 21 or a current position detection means 21 for detecting a current position, a road-condition information acquisition processing means 91 for acquiring information regarding road conditions, a required deceleration calculation processing means 92 for calculating a required deceleration on the basis of the current position and the information regarding road conditions, an optimal speed-change stage calculation processing means 93 for calculating an optimal speed-change stage on the basis of the required deceleration, an adjustable torque calculation processing means 94 for calculating an adjustable torque on the basis of the required deceleration and a deceleration corresponding to the optimal speed-change stage, a transmission 113 for performing a speed-change operation on the basis of the optimal speed-change stage, and a torque control processing means 95 for driving the drive motor 18 to generate the adjustable torque.

Figure 2:
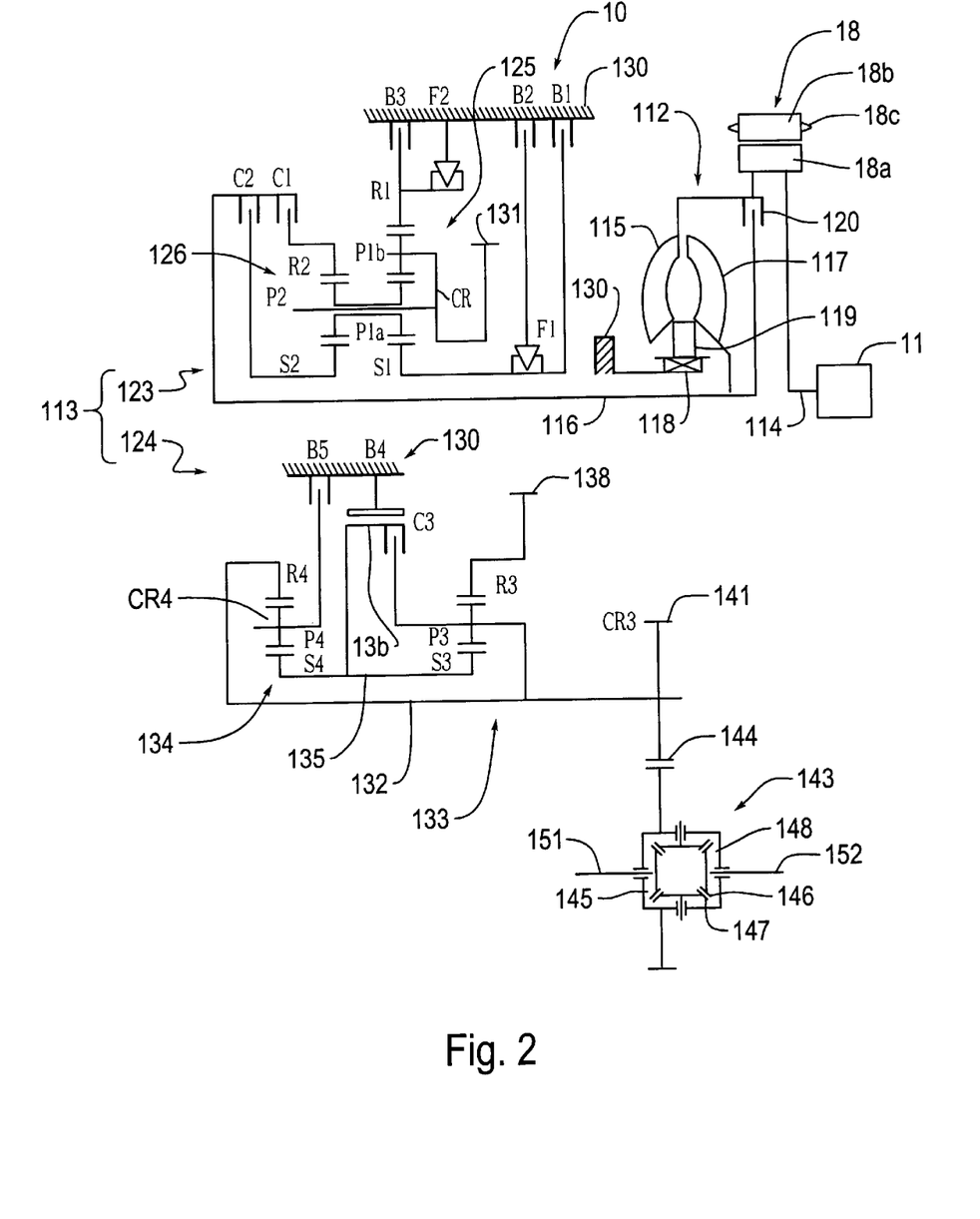
FIG. 2 is a conceptual view of a hybrid vehicle according to the embodiment of the present invention.
Figure 3:
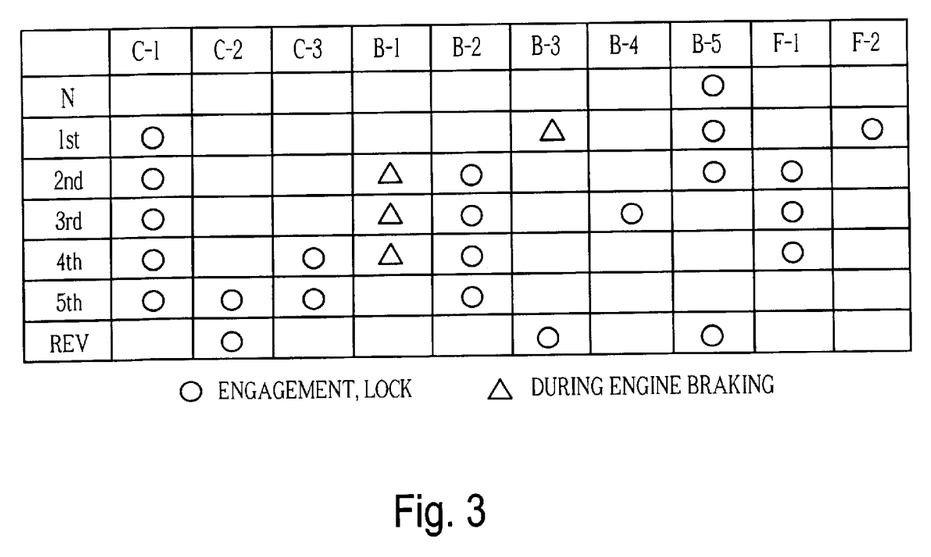
FIG. 3 is an operational chart for an automatic transmission according to the embodiment of the present invention.

FIG. 2 is a conceptual view of a hybrid vehicle according to the embodiment of the present invention. FIG. 3 is an operational chart for an automatic transmission according to the embodiment of the present invention.

FIG. 2 shows an automatic transmission 10, an engine 11, and the drive motor 18. The drive motor 18 has a rotor 18a, a stator 18b, a coil 18c, and the like. The rotor 18a is fitted to an output shaft 114 of the engine 11.

A torque converter 112 transmits rotation generated by driving the engine 11 and the drive motor 18 to the transmission 113. The torque converter 112 is composed of a pump impeller 115 coupled to the rotor 18a, a turbine runner 117 coupled to an input shaft 116 for inputting rotation to the transmission 113, a stator 119 fitted onto a one-way clutch 118, a lock-up clutch 120 that is locked to couple the output shaft 114 and the input shaft 116 to each other when a predetermined condition is fulfilled, a damper (not shown), and the like.

The automatic transmission 10 is drivingly coupled to the output shaft 114. Rotation (power) from the engine 11 is transmitted to the automatic transmission 10. A plurality of speed-change stages for changing a speed of rotation transmitted from the engine 11 are formed in the automatic transmission 10. The automatic transmission 10 outputs rotation corresponding to each of the speed-change stages to drive shafts 151, 152, which are drivingly coupled to driving wheels (not shown). The drive motor 18 is drivingly coupled to a torque transmission system (power transmission path) extending from the output shaft 114 to the drive shafts 151, 152. The drive motor 18 supplies a torque to the torque transmission system and absorbs a torque from the torque transmission system.

The transmission 113 is composed of a main transmission 123 and an auxiliary transmission 124. The transmission 113 has a first clutch C1, a second clutch C2, a third clutch C3, a first brake B1, a second brake B2, a third brake B3, a fourth brake B4, and a fifth brake B5 as frictional engagement elements.

The main transmission 123 has a planetary gear unit composed of a double-pinion planetary gear unit 125 and a simple planetary gear unit 126. The double-pinion planetary gear unit 125 has a sun gear S1, a ring gear R1 disposed concentrically with the sun gear S1, pinions P1a, P1b that are brought into mesh with the sun gear S1 and the ring gear R1 respectively, and a carrier CR supporting the pinions P1a, P1b rotatably, as gear elements. The simple planetary gear unit 126 has a sun gear S2, a ring gear R2 disposed concentrically with the sun gear S2, a pinion P2 that is brought into mesh with the sun gear S2 and the ring gear R2, and the carrier CR supporting the pinion P2 rotatably, as gear elements. The carrier CR is common to the double-pinion planetary gear unit 125 and the simple planetary gear unit 126.

The sun gear S1 and an automatic transmission case 130 are coupled to each other via the first brake B1 and via the second brake B2 and a first one-way clutch F1. The first brake B1, the second brake B2, and the first one-way clutch F1 are disposed in parallel with one another. The ring gear R1 and the automatic transmission case 130 are coupled to each other via the third brake B3 and a second one-way clutch F2, which are disposed in parallel with each other. The carrier CR and a counter drive gear 131 are coupled to each other. Sun gear S2 and the input shaft 116 are coupled to each other via the second clutch C2, and the ring gear R2 and the input shaft 116 are coupled to each other via the first clutch C1.

The auxiliary transmission 124 is disposed along a counter drive shaft 132 that is disposed parallel to the input shaft 116. The auxiliary transmission 124 is composed of a front planetary gear unit 133 disposed on the front side on the counter drive shaft 132 and a rear planetary gear unit 134 disposed on the rear side on the counter drive shaft 132.

The front planetary gear unit 133 has a sun gear S3, a ring gear R3 disposed concentrically with the sun gear S3, a pinion P3 that is brought into mesh with the sun gear S3 and the ring gear R3, and a carrier CR3 supporting the pinion P3 rotatably. On the other hand, the rear planetary gear unit 134 has a sun gear S4, a ring gear R4 disposed concentrically with the sun gear S4, a pinion P4 that is brought into mesh with the sun gear S4 and the ring gear R4, and a carrier CR4 supporting the pinion P4 rotatably, as gear elements.

The sun gears S3, S4 are coupled to each other via a coupling member 135. The coupling member 135 and the carrier CR3 are coupled to each other via the third clutch C3 and a coupling member 136. Furthermore, the coupling member 136 and the automatic transmission case 130 are coupled to each other via the fourth brake B4. A counter driven gear 138 is formed on an outer periphery of the ring gear R3. The counter driven gear 138 and the counter drive gear 131 are brought into mesh with each other, so that rotation of the main transmission 123 can be transmitted to the auxiliary transmission 124. The carrier CR4 and the automatic transmission case 130 are coupled to each other via the fifth brake B5. The ring gear R4 and the counter drive shaft 132 are coupled to each other.

An output gear 141 fixed to the counter drive shaft 132 and a large ring gear 144 of a differential 143 are brought into mesh with each other. The differential 143 has left and right side gears 145, 146 and pinions 147, 148 that are brought into mesh with the side gears 145, 146 respectively. The differential 143 distributes rotation that has been transmitted via the large ring gear 144 and transmits it to the drive shafts 151, 152, which are drivingly coupled to the driving wheels (not shown) respectively.

It will now be described how the automatic transmission 10 constructed as described above operates.

FIG. 3 shows a neutral range N, a first-speed forward range 1ST, a second-speed forward range 2ND, a third-speed forward range 3RD, a fourth-speed forward range 4TH, a fifth-speed forward range 5TH, and a backward range REV.

An engaged state of the first clutch C1, the second clutch C2, the third clutch C3, the first brake B1, the second brake B2, the third brake B3, the fourth brake B4, or the fifth brake B5 or a locked state of the first one-way clutch F1 or the second one-way clutch F2 is marked with "○". An engaged state of the first brake B1 or the third brake B3 during engine braking is marked with "Δ".

In the first-speed forward range, the first clutch C1 and the fifth brake B5 are engaged, and the second one-way clutch F2 is locked. If rotation of the input shaft 116 (FIG. 2) is transmitted to the ring gear R2 via the first clutch C1 in this state, the ring gear R1 is urged to rotate reversely while being stopped by the second one-way clutch F2. Therefore, the sun gear S1 is rotated reversely in an idling manner, and the carrier CR is rotated while being decelerated substantially.

If the ring gear R3 is rotated reversely as a result of transmission of rotation of the carrier CR to the counter driven gear 138 via the counter drive gear 131, the carrier CR3 is rotated reversely while being decelerated more substantially, because the carrier CR4 is stopped by the fifth brake B5. Accordingly, first-speed rotation is transmitted to the differential 143 via the output gear 141, distributed by the differential 143, and transmitted to the drive shafts 151, 152.

In the second-speed forward range, the first clutch C1, the second brake B2, and the fifth brake B5 are engaged, and the first one-way clutch F1 is locked. If rotation of the input shaft 116 is transmitted to the ring gear R2 via the first clutch C1 in this state, the sun gear S2 is urged to rotate reversely. However, the sun gear S1 is stopped by the second brake B2 and the first one-way clutch F1. Therefore, the ring gear R1 is rotated positively in an idling manner, and the carrier CR is rotated while being decelerated.

If the ring gear R3 is rotated reversely as a result of transmission of rotation of the carrier CR to the counter driven gear 138 via the counter drive gear 131, the carrier CR3 is rotated while being decelerated substantially, because the carrier CR4 is stopped by the fifth brake B5. Accordingly, second-speed rotation is transmitted to the differential 143 via the output gear 141, distributed by the differential 143, and transmitted to the drive shafts 151, 152.

In the third-speed forward range, the first clutch C1, the second brake B2, and the fourth brake B4 are engaged, and the first one-way clutch F1 is locked. If rotation of the input shaft 116 is transmitted to the ring gear R2 via the first clutch C1 in this state, the sun gear S2 is urged to rotate reversely. However, the sun gear S1 is stopped by the second brake B2 and the first one-way clutch F1. Therefore, the ring gear R1 is rotated positively in an idling manner, and the carrier CR is rotated while being decelerated.

The fourth brake B4 is then engaged in the auxiliary transmission 124, whereby the sun gears S3, S4 are stopped. Therefore, if rotation of the carrier CR is transmitted to the ring gear R3 via the counter drive gear 131 and the counter driven gear 138, the carrier CR3 and the ring gear R4 are rotated while being accelerated. Accordingly, third-speed rotation is transmitted to the differential 143 via the output gear 141, distributed by the differential 143, and transmitted to the drive shafts 151, 152.

In the fourth-speed forward range, the first clutch C1, the third clutch C3, and the second brake B2 are engaged, and the first one-way clutch F1 is locked. If rotation of the input shaft 116 is transmitted to the ring gear R2 via the first clutch C1 in this state, the sun gear S2 is urged to rotate reversely. However, the sun gear S1 is stopped by the second brake B2 and the first one-way clutch F1. Therefore, the ring gear R1 is rotated positively in an idling manner, and the carrier CR is rotated while being decelerated.

The third clutch C3 is then engaged in the auxiliary transmission 124, whereby the front planetary gear unit 133 and the rear planetary gear unit 134 are directly coupled to each other. Therefore, rotation of the carrier CR is directly transmitted to the output gear 141 via the counter drive gear 131 and the counter driven gear 138. Accordingly, fourth-speed rotation is transmitted to the differential 143 via the output gear 141, distributed by the differential 143, and transmitted to the drive shafts 151, 152.

In the fifth-speed forward range, the first clutch C1, the second clutch C2, the third clutch C3, and the second brake B2 are engaged. The first clutch C1 and the second clutch C2 are engaged in the main transmission 123 in this state, whereby the double-pinion planetary gear unit 125 and the simple planetary gear unit 126 are directly coupled to each other. Therefore, rotation of the input shaft 116 is directly transmitted to the counter drive gear 131.

The third clutch C3 is then engaged in the auxiliary transmission 124, whereby the front planetary gear unit 133 and the rear planetary gear unit 134 are directly coupled to each other. Therefore, rotation that has been transmitted to the counter driven gear 138 via the counter drive gear 131 is directly transmitted to the output gear 141. Accordingly, fifth-speed rotation is transmitted to the differential 143 via the output gear 141, distributed by the differential 143, and transmitted to the drive shafts 151, 152.

Each of the first clutch C1, the second clutch C2, the third clutch C3, the first brake B1, the second brake B2, the third brake B3, the fourth brake B4, and the fifth brake B5 is designed to be engaged or released by supplying a predetermined hydraulic pressure or a predetermined shift pressure to a corresponding hydraulic servo disposed in a hydraulic circuit (not shown).

Figure 4:
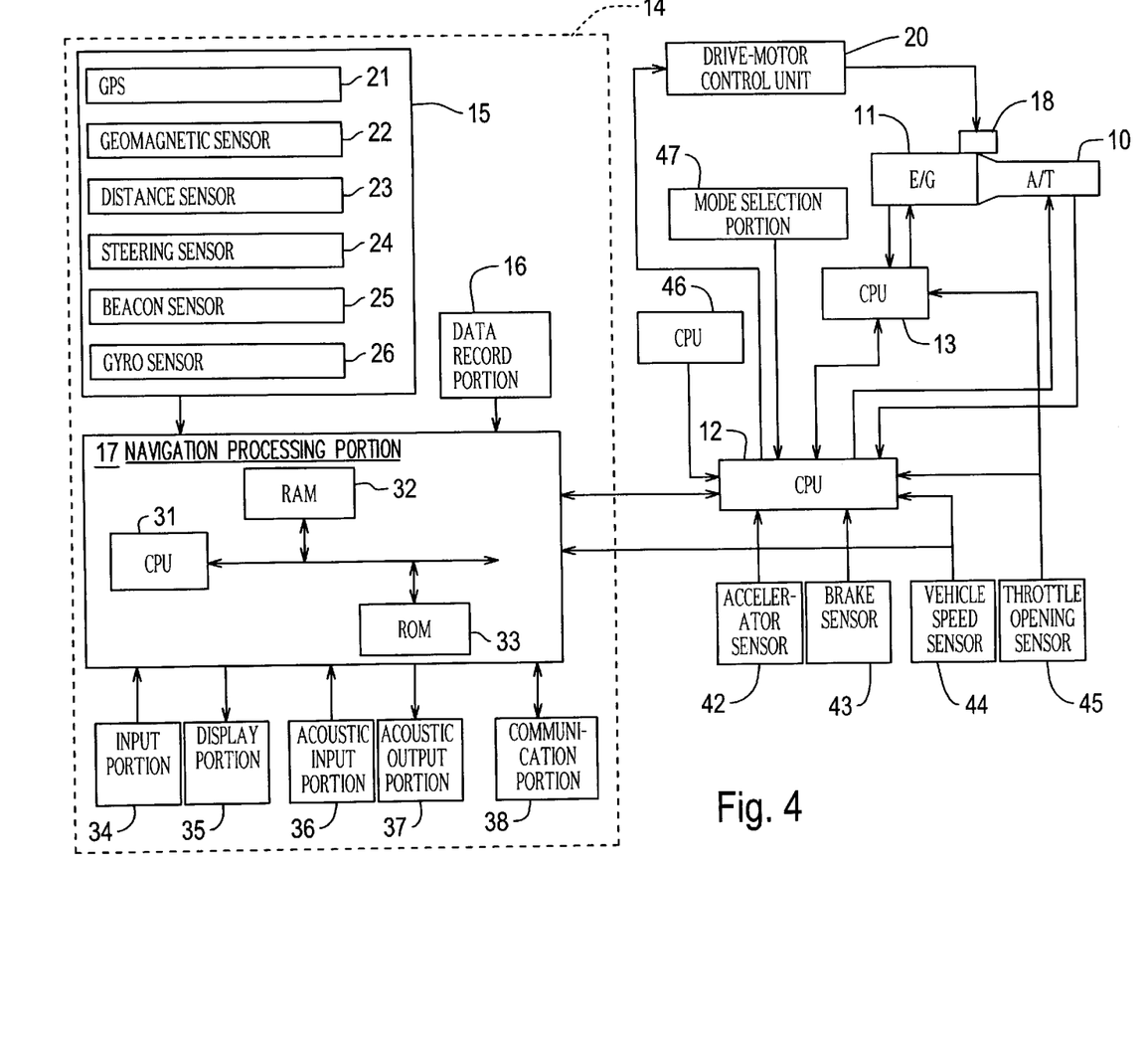
FIG. 4 is a schematic view of the apparatus for drivingly controlling hybrid vehicles according to the embodiment of the present invention.

FIG. 4 is a schematic view of an apparatus for drivingly controlling hybrid vehicles according to the embodiment of the present invention.

FIG. 4 shows the automatic transmission (A/T) 10, the engine (E/G) 11, an automatic-transmission control unit (CPU) 12 for controlling the automatic transmission 10, an engine control unit (CPU) 13 for controlling the engine 11, a navigation system 14, the drive motor 18, a drive-motor control unit 20 for controlling the drive motor 18, and a CPU 31 for controlling the navigation system 14.

An accelerator sensor 42 detects a position of an accelerator pedal (not shown) operated by a driver, namely, an accelerator-pedal position. A brake sensor 43 detects a position of a brake pedal (not shown) operated by the driver, namely, a brake-pedal position. A vehicle speed sensor 44 detects a vehicle speed V. A throttle opening sensor 45 detects an opening of a throttle valve. A ROM 46 is designed as a recording medium. A mode selection portion 47 selects a normal mode or a navigation mode.

The navigation system 14 has a current position detection portion 15, a data record portion 16, a navigation processing portion 17, an input portion 34, a display portion 35, an acoustic input portion 36, an acoustic output portion 37, and a communication portion 38. The current position detection portion 15 detects a current position or the like. The data record portion 16 is designed as a recording medium in which road data and the like are recorded. The navigation processing portion 17 is disposed as a computer, functions as various processing means, and performs various calculation processings such as navigation processings on the basis of input information. The vehicle speed sensor 44 and the CPU 12 are connected to the navigation processing portion 17.

The current position detection portion 15 is composed of the GPS 21 designed as the current position detection means, a geomagnetic sensor 22, a distance sensor 23, a steering sensor 24, a beacon sensor 25, a gyro sensor 26, an altimeter (not shown), and the like. The GPS 21 detects a current position on the earth by receiving electric waves emitted from an artificial satellite. The geomagnetic sensor 22 detects an azimuth of a driver's vehicle by measuring geomagnetism. The distance sensor 23 detects a distance between predetermined positions on a road or the like. For instance, a sensor designed to measure a rotational speed of a wheel (not shown) and detect a distance on the basis of the rotational speed, a sensor designed to measure an acceleration and detect a distance by integrating the acceleration twice, or the like can be employed as the distance sensor 23.

The steering sensor 24 detects a steering angle. For instance, an optical rotational sensor attached to a rotating portion of a steering wheel (not shown), a rotational resistance sensor, an angular sensor attached to a wheel, or the like, is employed as the steering sensor 24.

The beacon sensor 25 detects a current position by receiving positional information from electro-wave beacons or optical beacons disposed along a road, or the like. The gyro sensor 26 detects a rotational angular speed or a steering angle of the vehicle. For instance, a gas rate gyro, an oscillatory gyro, or the like is employed as the gyro sensor 26. An azimuth of the driver's vehicle can be detected by integrating a steering angle detected by the gyro sensor 26.

Each of the GPS 21 and the beacon sensor 25 can detect a current position by itself. A current position can also be detected by combining a distance detected by the distance sensor 23, an azimuth of the driver's vehicle detected by the geomagnetic sensor 22, and a steering angle detected by the gyro sensor 26. A current position can also be detected by combining a distance detected by the distance sensor 23 and a steering angle detected by the steering sensor 24.

The data record portion 16 has a data base composed of data files such as a map data file, an intersection data file, a node data file, a road data file, a photo data file, and a facility information data file in which pieces of information regarding facilities such as hotels, petrol stations, parking lots, or tourist information centers in different regions are recorded. In addition to data for searching for a route, various additional data for displaying guide maps along the found route on a screen set on a display (not shown) of the display portion 35, displaying photos or simplified maps characteristic of a certain intersection or route or the like, displaying a distance to the nearest intersection, a direction of travel at the nearest intersection, or the like, and displaying other pieces of guide information, are recorded in each of the data files. Various data for outputting predetermined information from the acoustic output portion 37 are also recorded in the data record portion 16.

Intersection data regarding different intersections are recorded in the intersection data file. Node data regarding nodes are recorded in the node data file. Road data regarding roads are recorded in the road data file. The intersection data, the node data, and the road data constitute road condition data representing road conditions. The node data constitute at least positions and geometries of roads in map data that are recorded in the map data file. The node data are composed of data regarding turns (including intersections, T-junctions, and the like) on actual roads, nodes, inter-node links coupling the nodes to one another, and the like.

The road data constitutes widths, cambers, cants, banks, conditions of road surfaces, the number of lanes on each of the roads, spots where the number of lanes is reduced, spots where the width is narrowed, and the like. As for corners, the road data constitute curvatures, intersections, T-junctions, corner entrances, and the like. As for road attributes, the road data constitute downward slopes, upward slopes, and the like. As for road types, the road data constitute national highways, ordinary roads, expressways, and the like. In addition, the road data also constitute railway crossings, ramps at the exits of expressways, tollgates for expressways, and the like.

The navigation processing portion 17 is composed of the CPU 31, a RAM 32, and a ROM 33. The RAM 32 is used as a working memory when the CPU 31 performs various calculation processings. The ROM 33 is designed as a record medium in which various programs for searching for a route to a destination, providing guidance through the route, and determining specific sections, etc., as well as control programs are recorded. The input portion 34, the display portion 35, the acoustic input portion 36, the acoustic output portion 37, and the communication portion 38 are connected to the navigation processing portion 17.

The data record portion 16 and the ROM's 33, 46 are constructed of magnetic cores (not shown), semiconductor memories (not shown), or the like. Various recording media such as magnetic tapes, magnetic disks, floppy disks, magnetic drums, CD's, MD's, DVD's, optical disks, MO's, IC cards, and optical cards can also be employed as the data record portion 16 and the ROM's 33, 46.

Although this embodiment is designed such that various programs are recorded in the ROM 33 and that various data are recorded in the data record portion 16, it is also possible to record programs, data, and the like in a single external record medium. For instance, in this case, it is possible to dispose a flash memory (not shown) in the navigation processing portion 17, read out the programs, data, and the like from the external record medium, and write them into the flash memory. Accordingly, the programs, data, and the like can be updated by replacing the external record medium with another one. Programs for controlling the automatic transmission control unit 12, and the like, can also be recorded in the external record medium. Thus, it is possible to start programs recorded in various record media and perform various processings on the basis of data.

Furthermore, the communication portion 38 is designed such that various programs, data, and the like are transmitted to and received from an FM multi-channel transmitter, a telephone line, a communication line, or the like. For instance, the communication portion 38 receives various data such as information regarding traffic accidents and D-GPS information for detecting errors in detection by the GPS 21, as well as traffic information, which is composed of various pieces of information received by a receiver such as an information center (not shown), namely, information regarding parking lots, information regarding regulations, information regarding traffic jam, and the like.

It is also possible to transmit programs for performing the functions of the present invention, other programs for operating the navigation system 14, data, and the like from an information center, such as an internet server, a navigation server, or the like) to a plurality of base stations. Such base stations may include communication stations connected via terminals of internet providers, the communication portion 38, telephone lines, communication lines, and the like. The programs, data, and the like can also be transmitted from the base stations to the communication portion 38. For instance, upon receiving at least some of the programs and data transmitted from the base stations, the CPU 31 downloads them into a readable-writable memory, for example, a recording medium such as the RAM 32, a flash memory, or a hard disk. The CPU 31 then starts the programs and thus can perform various processings on the basis of the data. The programs and data can be recorded in either different recording media or a single recording medium.

It is also possible to download programs, data, and the like, transmitted from the information center into a recording medium such as a memory stick or a floppy disk by means of a home personal computer. The programs may then be started to perform various processings on the basis of the data. The memory stick and the floppy disk can be inserted into and removed from the personal computer.

The input portion 34 is designed to correct a current position at the time of departure and input a destination. The input portion 34 is composed of operational switches such as operational menus and operational keys displayed in the form of images on the screen set on the display. Accordingly, an inputting operation can be performed by pressing (touching) the operational switches. A remote controller, a light pen, a bar-code reader, a mouse, a keyboard disposed separately from the display portion 35, or the like can also be employed as the input portion 34.

Operational guidance, operational menus, guidance for operational keys, a route from a current position to a destination, information regarding guidance along the route, and the like are displayed on the screen set on the display. A display such as a CRT display, a liquid-crystal display, or a plasma display can be employed as the display portion 35. Alternatively, a holographic system for projecting holograms onto a windshield or the like can also be employed as the display portion 35.

The acoustic input portion 36 is constructed of a microphone (not shown) or the like. Necessary information can be input to the acoustic input portion 36 acoustically. In addition, the acoustic output portion 37 is provided with a speech synthesis unit (not shown) and a speaker (not shown). Pieces of acoustic information such as speed-change information and guide information composed of sounds synthesized by the speech synthesis unit are output from the speaker. In addition to the sounds synthesized by the speech synthesis unit, various sounds and various pieces of guide information recorded beforehand on a tape or in a memory or the like can also be output from the speaker.

In the apparatus for drivingly controlling hybrid vehicles constructed as described above, the automatic-transmission control unit 12 performs an upshift operation or a downshift operation according to a program recorded in the ROM 46.

If the driver selects the normal mode by operating the mode selection portion 47, a speed-change processing means (not shown) of the automatic-transmission control unit 12 refers to a speed-change map (not shown) in the ROM 46 on the basis of a vehicle speed V detected by the vehicle speed sensor 44 and a throttle opening detected by the throttle opening sensor 45, and determines a speed-change stage corresponding to the vehicle speed V and the throttle opening.

If the driver selects the navigation mode by operating the mode selection portion 47, the apparatus for drivingly controlling hybrid vehicles performs running control such as corner control in accordance with navigation information obtained from the navigation system 14 and road condition data designed as road condition information. In addition to running control, intersection control and winding control for preventing a deterioration in driving comfort in the case where there are some corners in succession can be performed as running control. Furthermore, the engine control unit 13 can also perform driving control as to the throttle opening, the engine speed, and the like, as running control.

It will now be described how the navigation system 14 operates in the case where corner control is performed.

Figure 5:
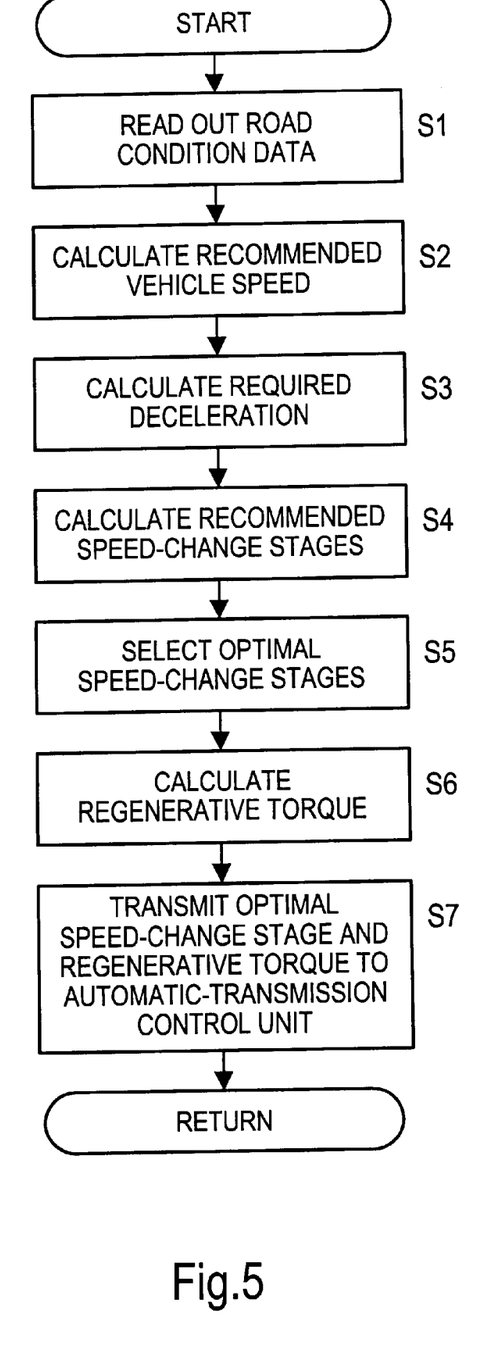
FIG. 5 is a flowchart showing how a navigation system operates when corner control according to the embodiment of the present invention is performed.
Figure 6:
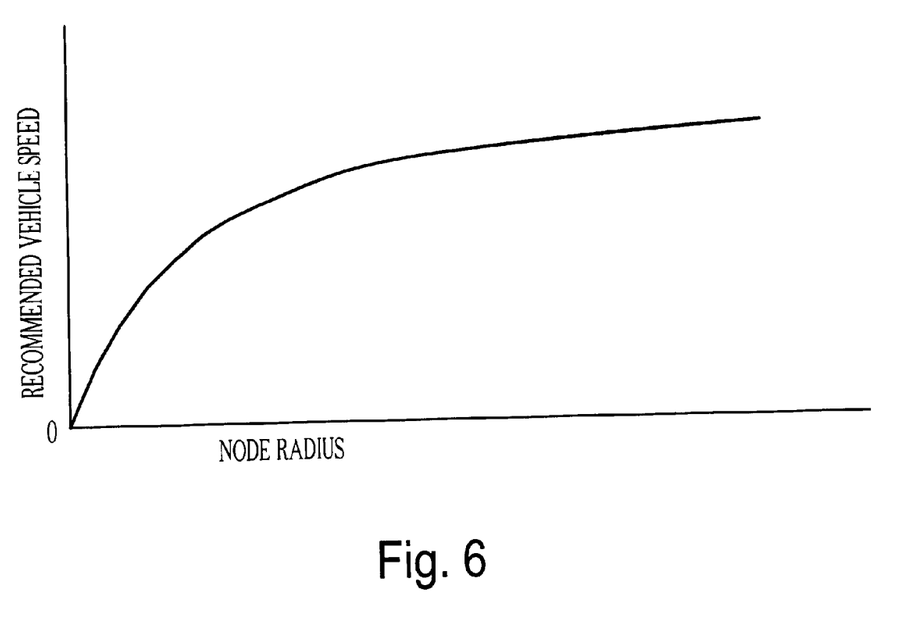
FIG. 6 is a map showing recommended vehicle speeds according to the embodiment of the present invention.
Figure 7:
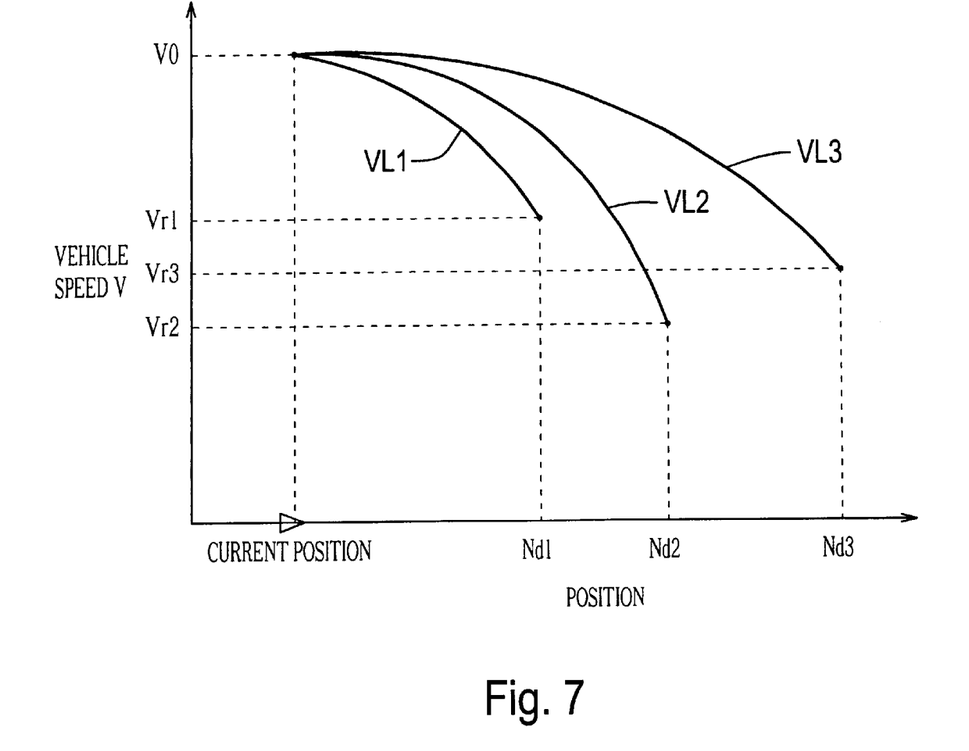
FIG. 7 is an explanatory view of decelerated states of the hybrid vehicle according to the embodiment of the present invention.
Figure 8:
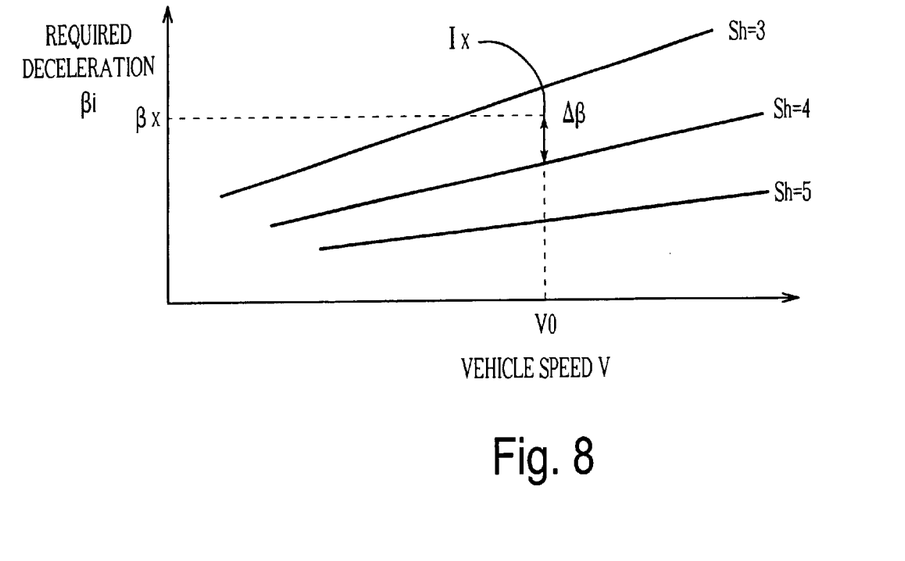
FIG. 8 is a map showing recommended speed-change stages according to the embodiment of the present invention.

FIG. 5 is a flowchart showing how the navigation system operates when corner control according to the embodiment of the present invention is performed. FIG. 6 is a map showing recommended vehicle speeds according to the embodiment of the present invention. FIG. 7 is an explanatory view of decelerated states of the hybrid vehicle according to the embodiment of the present invention. FIG. 8 is a map showing recommended speed-change stages according to the embodiment of the present invention.

In FIG. 6, the axis of abscissa and the axis of ordinate represent node radius and recommended vehicle speed respectively. In FIG. 7, the axis of abscissa and the axis of ordinate represent position and vehicle speed V respectively. In FIG. 8, the axis of abscissa and the axis of ordinate represent vehicle speed V and required deceleration $\beta i$ respectively.

If the navigation system 14 (FIG. 4) is activated, the CPU 31 reads a current position detected by the GPS 21. The road-condition information acquisition processing means 91 (FIG. 1) of the CPU 31 performs a processing of acquiring information regarding road conditions, accesses the intersection data file, the node data file, and the road data file in the data record portion 16, reads out and acquires road condition data in a predetermined range in the direction of travel from the current position, and records them in the RAM 32 in the form of control data. The road condition data include node data regarding each node, the gradient of a road at each node, a distance from a current position to the entrance of a corner, and the like. The road-condition information acquisition processing means 91 can also acquire road condition data via the communication portion 38.

The CPU 31 determines whether conditions for performing control are fulfilled. The conditions for performing control include that the road condition data exist in the intersection data file, the node data file, and the road data file, that no fail operation has occurred, and the like.

If the conditions for performing control are then fulfilled, a road geometry determination processing means (not shown) of the CPU 31 performs a processing of determining the geometry of a road and determines the geometry of the road. The road geometry determination processing means creates a control list on the basis of road condition data at the current position and road condition data in a predetermined range in the direction of travel from the current position (e.g., 1 to 2 [km] from the current position), and calculates a node radius as to each node on a road including the current position. The node radius represents the curvature of the road. If necessary, it is also possible to search for a route from a current position to a destination and calculate a node radius as to each node on the found route.

A node radius calculation processing means of the road geometry determination processing means performs calculations in accordance with the node data belonging to the road condition data and on the basis of an absolute coordinate of each node and absolute coordinates of two nodes adjacent to each node, and calculates the node radius. It is also possible to record beforehand node radii as road data in the data record portion 16, for example, such that each of the node radii corresponds to a specific one of the nodes, and read out the node radii if necessary.

If a node with a node radius smaller than a threshold Rth is detected in the predetermined range, the road geometry determination processing means determines that there is a corner requiring corner control.

A recommended vehicle speed calculation processing means (not shown) of the CPU 31 then selects a specific node Ndi (i=1, 2, . . . ) with a node radius smaller than the threshold Rth from the nodes in the predetermined range, refers to the recommended vehicle speed map shown in FIG. 6 and recorded in the ROM 33, and calculates a recommended vehicle speed Vri (i=1, 2, . . . ) as to each node Ndi. In the recommended vehicle speed map, the recommended vehicle speed is set lower as the node radius decreases and higher as the node radius increases, so that the vehicle can negotiate the corner stably.

The recommended vehicle speed Vri is not to be set exclusively as to each node Ndi. If necessary, it is also possible to set interpolation points by equally dividing links connecting nodes Ndi and set the recommended vehicle speed Vri as to each of the interpolation points as well.

As shown in FIG. 7, the required deceleration calculation processing means 92 of the CPU 31 calculates a deceleration required for the vehicle speed V to change from a current vehicle speed V0 to the recommended vehicle speed Vri before reaching each node Ndi, namely, a required deceleration $\beta i$ (i=1, 2, . . . ). The required deceleration $\beta i$ corresponds to the gradient of a line VL1, VL2, or VL3 representing changes in the vehicle speed V shown in FIG. 7. The required deceleration $\beta i$ can be calculated by referring to a deceleration map (not shown) recorded in the ROM 33, on the basis of the recommended vehicle speed Vri, the current vehicle speed V0 at the current position, and a distance Li (i=1, 2, . . . ) from the current position to each node Ndi. The required deceleration $\beta i$ can also be calculated according to a predetermined equation.

If the required deceleration $\beta i$ is thus calculated as to each node Ndi, a recommended speed-change stage calculation processing means (not shown) of the CPU 31 performs a processing of calculating recommended speed-change stages, and calculates recommended speed-change stages by referring to the recommended speed-change stage map shown in FIG. 8 and recorded beforehand in the ROM 33.

The recommended speed-change stage map represents a relation between the vehicle speed V and the required deceleration βi using speed-change stages Sh as the parameters, on the basis of an inertial force such as a vehicle weight. Accordingly, if it is assumed that the required deceleration βi that has been calculated is βx, an intersection point Ix of the current vehicle speed V0 and the value βx is obtained. One of the speed-change stages Sh contiguous to the intersection point Ix that has the smaller speed-change ratio, namely, the fourth-speed stage shown in FIG. 8 is recommended.

The required deceleration βi is calculated as to each node Ndi every time the vehicle passes it. The recommended speed-change stages are also calculated as to each node Ndi. In general, the recommended speed-change stage regarding the node Ndi closest to the current position is often the lowest recommended speed-change stage (with the largest speed-change ratio) (hereinafter referred to as "the optimal speed-change stage"). However, if the road has a certain radius of curvature, the recommended speed-change stage regarding another node Ndi may be the optimal speed-change stage. Thus, the optimal speed-change stage calculation processing means 93 of the CPU 31 performs a process of calculating an optimal speed-change stage, selects the lowest one of the recommended speed-change stages (with the largest speed-change ratio), and calculates the optimal speed-change stage.

The adjustable torque calculation processing means 94 of the CPU 31 then performs a process of calculating an adjustable torque, refers to the recommended speed-change stage map, calculates a deceleration βs (βs>βi) that can be achieved by the optimal speed-change stage and the current vehicle speed V0, and calculates a regenerative torque TMg (a negative drive-motor torque TM) as an adjustable torque according to an equation (shown below) so that deceleration can further be increased by a differential deceleration Δβ (Δβ<0), that is, a difference between the required deceleration βi and the deceleration βs (i.e., Δβ=βi−βs).

$$TMg=(\Delta\beta \cdot W+Fr) \cdot Rw/(\gamma d \cdot I \cdot \eta \cdot t)-TE$$

W: vehicle weight
Fr: running resistance (Fr<0)
Rw: tire radius of driving wheels
γd: differential ratio of the differential 143
I: speed-change ratio of the optimal speed-change stage
η: transmission efficiency of the transmission 113
t: torque ratio of the torque converter 112
TE: engine torque The engine torque TE is required in calculating the regenerative torque TMg. The automatic-transmission control unit 12 refers to an engine target operational state setting map (not shown) recorded in the ROM 46 and calculates the engine torque TE on the basis of an engine speed NE.

The CPU 31 then transmits the optimal speed-change stage and the regenerative torque TMg to the automatic-transmission control unit 12.

In this embodiment, out of the required decelerations contiguous to the intersection point Ix, the speed-change stage Sh with the smaller speed-change ratio (i.e., the fourth-speed stage in FIG. 8) is recommended. However, in the case where the drive-motor torque TM can be generated by driving conditions of the drive motor 18 such as an amount, or state of charge (SOC), of electricity remaining in a battery, the speed-change stage with the larger speed-change ratio (i.e., the third-speed stage in FIG. 8) can be recommended. The adjustable torque calculation processing means 94 calculates a deceleration βt (βi>βt) that can be achieved by the optimal speed-change stage and the current vehicle speed V0, and calculates a power running torque TMa as an adjustable torque (a positive drive-motor torque TM) so that deceleration can further be reduced by a differential deceleration δβ (δβ>0), that is, a difference between the required deceleration βi and the deceleration βt (i.e., δβ=βi−βt).

The flowchart shown in FIG. 5 will now be described.

In step S1, the road condition data are read out.

In step S2, the recommended vehicle speed Vri is calculated.

In step S3, the required deceleration βi is calculated.

In step S4, the recommended speed-change stages are calculated.

In step S5, the optimal speed-change stage is selected.

In step S6, the regenerative torque TMg is calculated.

In step S7, the optimal speed-change stage and the regenerative torque TMg are transmitted to the automatic-transmission control unit 12. The control operation then returns to its initial state.

Figure 9:
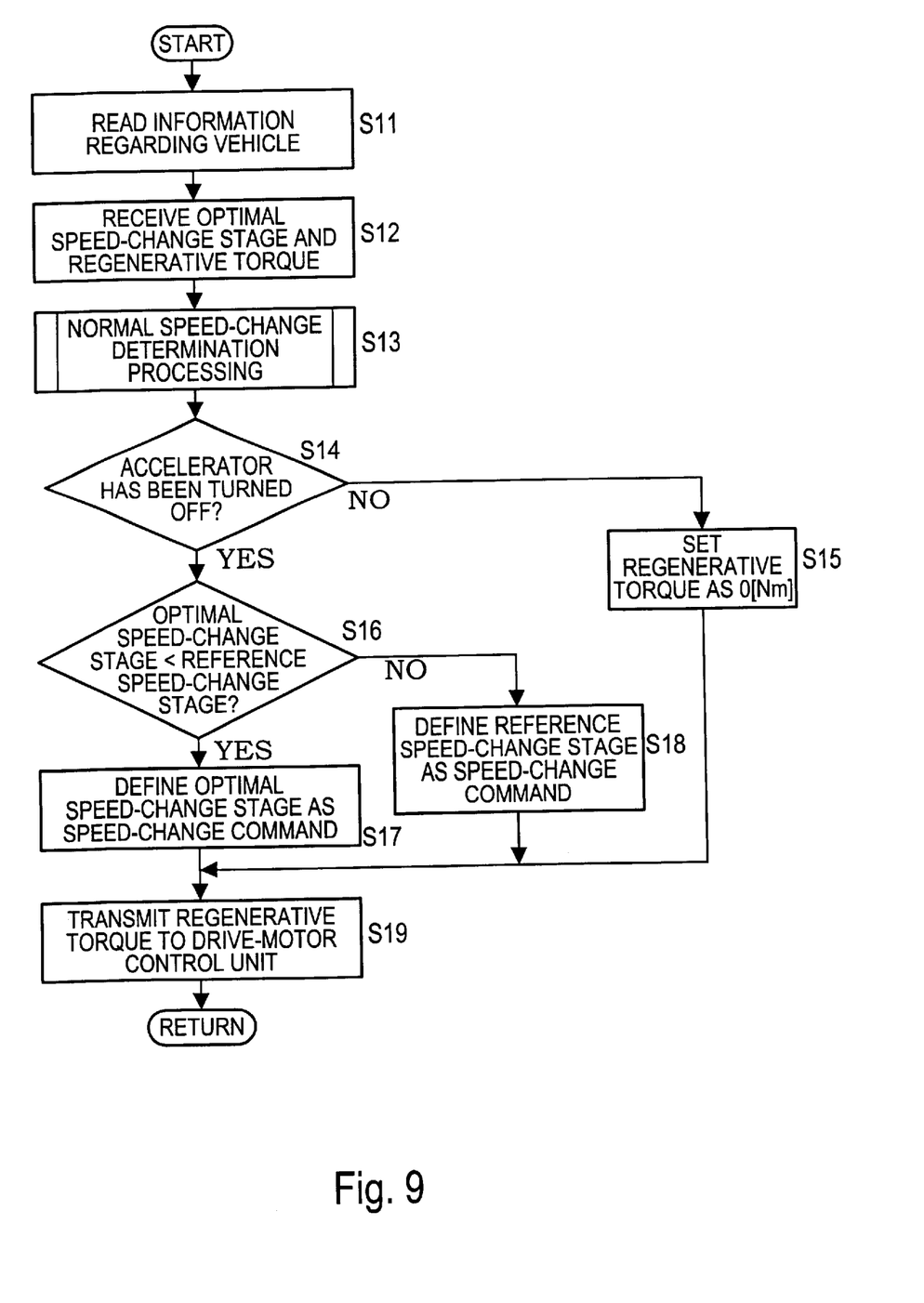
FIG. 9 is a flowchart showing how an automatic-transmission control unit operates when corner control according to the embodiment of the present invention is performed.

It will now be described how the automatic-transmission control unit 12 operates when corner control is performed.

FIG. 9 is a flowchart showing how the automatic-transmission control unit operates when corner control according to the embodiment of the present invention is performed.

The automatic-transmission control unit 12 (FIG. 4) reads pieces of information regarding the vehicle from vehicle-state detection means such as the accelerator sensor 42, the brake sensor 43, the vehicle speed sensor 44, the throttle opening sensor 45, an engine speed sensor (not shown), and an input speed sensor (not shown). The pieces of information regarding the vehicle include the vehicle speed V, the throttle opening, the engine speed, the input speed, and the like, as well as event information representing movements made by the driver, for example, information regarding decelerating operations such as the position of the accelerator pedal and the position of the brake pedal.

Upon receiving the optimal speed-change stage and the regenerative torque TMg from the navigation system 14, a normal speed-change determination processing means (not shown) of the automatic-transmission control unit 12 performs a normal speed-change determination process, refers to the speed-change map according to a normal speed-change schedule, calculates a speed-change stage corresponding to the vehicle speed V and the throttle opening, and defines the speed-change stage as a reference speed-change stage.

An event information determination processing means (not shown) of the automatic-transmission control unit 12 performs a process of making a determination on event information, and determines whether or not the accelerator has been turned off on the basis of the position of the accelerator pedal. If the accelerator has been turned off, a speed-change command setting processing means (not shown) of the automatic-transmission control unit 12 performs a speed-change command setting processing, determines whether or not the optimal speed-change stage is lower than the reference speed-change stage, defines the optimal speed-change stage as a speed-change command if the optimal speed-change stage is lower than the reference speed-change stage, and transmits the regenerative torque TMg to the drive-motor control unit 20.

In the automatic transmission 10, the transmission 113 (FIG. 2) performs a speed-change operation such that the optimal speed-change stage is achieved according to the speed-change command. Upon receiving the regenerative torque TMg, the torque control processing means 95 (FIG. 1) of the drive-motor control unit 20 performs a torque control process so as to generate the regenerative torque TMg, and drives the drive motor 18. Accordingly, a speed-change operation is performed to establish the optimal speed-change stage, and the regenerative torque TMg is generated. As a result, the required deceleration βi can be achieved.

If the optimal speed-change stage is equal to or higher than the reference speed-change stage, the speed-change command setting processing means defines the reference speed-change stage as the speed-change command, and transmits the regenerative torque TMg to the drive-motor control unit 20. In this case, although no speed-change operation is performed, the predetermined required deceleration βi can be achieved.

If the accelerator has not been turned off (i.e., if the accelerator has been turned on) during the process of making a determination on event information, it is assumed that the driver rests his or her foot on the accelerator pedal and has no intention of decelerating the vehicle. Therefore, the automatic-transmission control unit 12 sets the regenerative torque TMg as 0[Nm].

Thus, the optimal speed-change stage is calculated on the basis of the required deceleration βi. The regenerative torque TMg is calculated and generated on the basis of the required deceleration βi and the deceleration corresponding to the optimal speed-change stage. Therefore, the hybrid vehicle can travel and negotiate a corner while being decelerated at a suitable deceleration. Accordingly, driving comfort during corner control can be improved.

The flowchart shown in FIG. 9 will now be described.

In step S11, information regarding the vehicle is read.

In step S12, the optimal speed-change stage and the regenerative torque TMg are received.

In step S13, the normal speed-change determination processing is performed.

In step S14, it is determined whether or not the accelerator has been turned off. If the accelerator has been turned off, the control operation proceeds to step S16. If the accelerator has not been turned off (i.e., if the accelerator has been turned on), the control operation proceeds to step S15.

In step S15, the regenerative torque TMg is set as 0[Nm].

In step S16, it is determined whether the optimal speed-change stage is lower than the reference speed-change stage. If the optimal speed-change stage is lower than the reference speed-change stage, the control operation proceeds to step S17. If the optimal speed-change stage is equal to or higher than the reference speed-change stage, the control operation proceeds to step S18.

In step S17, the optimal speed-change stage is defined as a speed-change command.

In step S18, the reference speed-change stage is defined as a speed-change command.

In step S19, the regenerative torque TMg is transmitted to the drive-motor control unit 20, and the control operation returns to its initial state.

In this embodiment, the navigation system 14 is designed to calculate the recommended vehicle speed Vri and the required deceleration βi, calculate the recommended speed-change stages and the optimal speed-change stage, and calculate the regenerative torque TMg. However, the automatic-transmission control unit 12 may have the functions of calculating the recommended vehicle speed Vri, calculating the required deceleration βi, calculating the recommended speed-change stages and the optimal speed-change stage, and calculating the regenerative torque TMg. In this embodiment, the automatic-transmission control unit 12 performs the normal speed-change determination processing and sets the regenerative torque TMg and the speed-change command. However, the navigation system 14 may have the functions of performing the normal speed-change determination processing and setting the regenerative torque TMg and the speed-change command.

The present invention is not to be limited to the aforementioned embodiment. That is, various modifications can be made on the basis of the concept of the present invention. Such modifications are not to be excluded from the scope of the present invention.

What is claimed is:

1. An apparatus for drivingly controlling hybrid vehicles, comprising:

a drive motor;

current position detection means for detecting a current position;

road-condition information acquisition processing means for acquiring information regarding road conditions;

required deceleration calculation processing means for calculating a required deceleration on the basis of the current position and the information regarding road conditions;

optimal speed-change stage calculation processing means for calculating an optimal speed-change stage on the basis of the required deceleration;

adjustable torque calculation processing means for calculating an adjustable torque on the basis of the required deceleration and a deceleration corresponding to the optimal speed-change stage;

a transmission for performing a speed-change operation on the basis of the optimal speed-change stage; and torque control processing means for driving the drive motor to generate the adjustable torque.

2. The apparatus according to claim 1, further comprising:

recommended vehicle speed calculation processing means for calculating a recommended vehicle speed on the basis of the information regarding road conditions, wherein the required deceleration calculation processing means calculates the required deceleration on the basis of the recommended vehicle speed.

3. The apparatus according to claim 1, further comprising:

recommended speed-change stage calculation processing means for calculating recommended speed-change stages on the basis of the required deceleration, wherein the optimal speed-change stage calculation processing means calculates the lowest one of the recommended speed-change stages as the optimal speed-change stage.

4. The apparatus according to claim 1, wherein the deceleration corresponding to the optimal speed-change stage is calculated in accordance with the optimal speed-change stage and a current vehicle speed.

5. The apparatus according to claim 1, wherein the adjustable torque is a regenerative torque.

6. The apparatus according to claim 1, wherein the adjustable torque calculation processing means calculates an adjustable torque on the basis of the difference between the required deceleration and a deceleration corresponding to the optimal speed-change stage.

7. The apparatus according to claim 1, wherein the adjustable torque calculation processing means calculates an adjustable torque, which is outputted by the drive motor so as to achieved the required deceleration.

8. The apparatus according to claim 1, wherein the transmission achieves a plurality of speed-change stages.

9. A method for drivingly controlling hybrid vehicles, comprising the steps of:

detecting a current position;

acquiring information regarding road conditions;

calculating a required deceleration on the basis of the current position and the information regarding road conditions;

calculating an optimal speed-change stage on the basis of the required deceleration;

calculating an adjustable torque on the basis of the required deceleration and a deceleration corresponding to the optimal speed-change stage;

performing a speed-change operation on the basis of the optimal speed-change stage; and driving the drive motor to generate the adjustable torque.

10. A program for drivingly controlling hybrid vehicles, wherein a computer functions as current position detection means for detecting a current position, road-condition information acquisition processing means for acquiring information regarding road conditions, required deceleration calculation processing means for calculating a required deceleration on the basis of the current position and the information regarding road conditions, optimal speed-change stage calculation processing means for calculating an optimal speed-change stage on the basis of the required deceleration, adjustable torque calculation processing means for calculating an adjustable torque on the basis of the required deceleration and a deceleration corresponding to the optimal speed-change stage, and torque control processing means for driving a drive motor to generate the adjustable torque.

* * * * *